Jan. 16, 1945.　　　　E. D. SCHNEIDER　　　　2,367,619
CONTROL SYSTEM
Filed Sept. 30, 1943
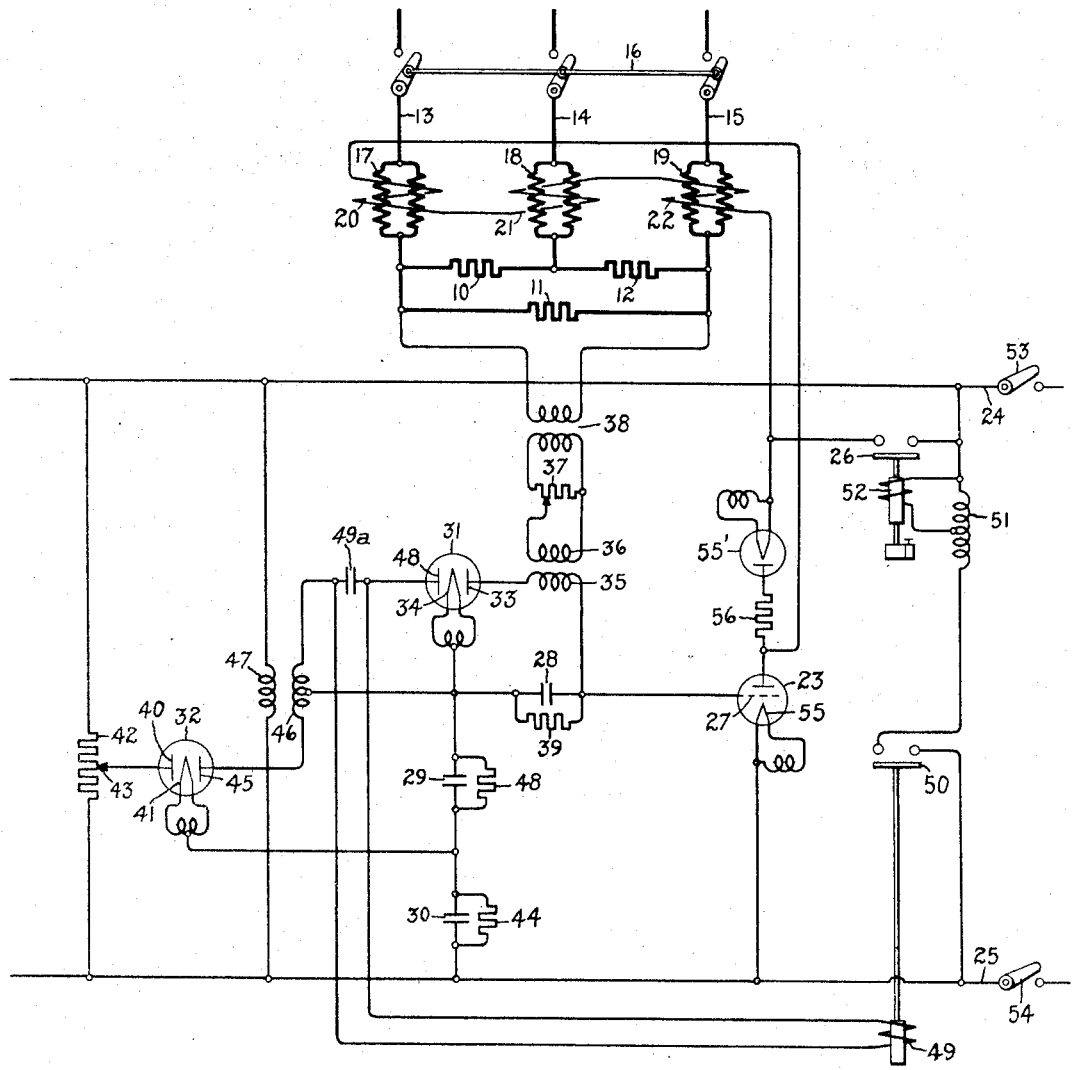
Inventor:
Elbert D. Schneider,
by Harry E. Dunham
His Attorney.

Patented Jan. 16, 1945

2,367,619

UNITED STATES PATENT OFFICE 2,367,619

CONTROL SYSTEM

Elbert D. Schneider, Scotia, N. Y., assignor to General Electric Company, a corporation of New York Application September 30, 1943, Serial No. 504,400

7 Claims. (Cl. 219—20)

My invention relates to control systems, more particularly to heating systems which are controlled by electric discharge devices, and has for its object a simple and reliable system of this character provided with means for substantially decreasing or interrupting the supply of current to the heating load in the event of failure of one or more of the electric discharge devices.

More particularly, my invention relates to control systems of the type described and claimed in my Patent 2,285,172, issued on June 2, 1942. Such systems, while highly useful and desirable, have the disadvantage that in the event of failure of certain of the electric discharge devices the maximum amount of power may be applied to the heating load. Of course, failure of the three-element vapor electric discharge device supplying current to the saturating winding results in a minimum supply of power to the load. In the event of failure, however, of the double electric valve device which controls the firing or operation of the vapor electric device, the vapor electric device may be maintained in a turned on or conducting condition so that maximum heating load is immediately applied.

In carrying out my invention in one form, I provide a normally open switch in circuit with the vapor electric discharge device and the saturating winding, together with a coil for maintaining this switch closed, which coil is connected to one circuit of the double valve device so that, in the event the valve device fails, the vapor electric device is rendered non-conducting and the heating load decreased to a minimum value.

For a more complete understanding of my invention, reference should be had to the accompanying drawing, the single figure of which is a diagrammatic representation of an electric heating system embodying my invention.

Referring to the drawing, I have shown my invention in one form as applied to the control of the electric power input to a load device consisting of three electric heating resistors 10, 11, and 12 which are connected in delta relation with each other to three-phase supply conductors 13, 14, and 15 which may be connected to a three-phase supply source by means of a suitable switch 16. Connected in the supply conductors, respectively, are current varying means shown as variable electric impedance devices such as saturable reactors 17, 18, and 19, provided with direct current saturating or control windings 20, 21, and 22. These saturating windings are connected in series with each other and in turn in series with a three-element vapor electric discharge device 23 across suitable alternating current supply mains 24 and 25, a normally open control switch 26 being provided in this circuit with the discharge device 23 and the saturating windings.

The voltage applied to the grid 27 of the discharge device 23 is controlled by means of three condensers or capacitors 28, 29, and 30, the voltages across which are controlled by means of double circuit rectifiers or electric valve discharge devices 31 and 32.

The capacitor 28 is connected in the discharge circuit formed by the anode 33 and cathode 34 of the valve 31 through one winding 35 of a transformer having an inductively related winding 36 which is responsive to the voltage across the load resistances. Thus, as shown, the winding 36 is connected across an adjustable portion of a resistor 37 which, in turn, is connected through a transformer 38 across the supply conductors 13 and 15 or, more specifically, across the resistor 11. Thus, a feedback voltage proportional to the voltage across the resistor 11 is applied to this discharge circuit of the valve 31 for charging of the capacitor 28 to a corresponding voltage. This capacitor 28 voltage is applied to make the grid 27 negative since the negative terminal of the capacitor 28 is connected to the grid and thereby tend to prevent the discharge device 23 from firing or passing current. In order to give this grid voltage a varying value even though the feedback voltage remains constant, a resistor 39 is connected across the capacitor 28 of a relatively low value such that between the pulsating positive half cycle voltage applied to the capacitor 28 through the electric valve 31 the voltage of the condenser leaks off through the resistance 39 substantially and, in a typical case, to less than one-half the peak voltage. This produces a pulsating negative bias control voltage for the grid 27 which is in opposition to a substantially constant positive bias voltage across the capacitor 30, as described and claimed in U. S. Patent 1,904,485, issued on April 18, 1933, to Orrin W. Livingston.

The capacitor 30 is connected in the discharge circuit formed by the anode 40 and cathode 41 of the valve 32, this circuit including a voltage from across a potentiometer resistance 42 connected to the supply mains 24, 25. By means of the adjustable tap 43, which may be moved on the resistance 42, a desired voltage from the resistance is applied to the circuit, thereby to maintain a predetermined voltage across the resistor 11, 12. A resistance 44 of relatively high value is connected across the capacitor 30, of such high value that little if any leakage of the voltage across the capacitor occurs through the resistance between the pulsations from the electric valve.

The capacitor 29 introduces a constant negative bias voltage in the grid circuit of the device 23 of such value as to make the grid 27 sufficiently negative to prevent firing of the device 23. This capacitor 29 is connected in the discharge circuit formed by the anode 45 and cathode 41 of the valve 32, together with a voltage supplied by a portion of the transformer coil 46, whose primary winding 47 is connected across the conductors 24 and 25. A resistance 48 of relatively high value is connected across the capacitor 29 so as to maintain a substantially constant voltage across the capacitor.

The purpose of the capacitor 29 is to assure a sufficient negative bias to prevent firing of the device 23 in the event that the tap 43 is moved to reduce the voltage across the resistors to a very low value such that the feed-back voltage applied to the capacitor 28 is insufficiently negative to prevent firing of the device 23 even though the voltage across the capacitor 30 is correspondingly low. In such case, if the bias of the capacitor 29 were not provided, the device 23 would operate continuously by reason of the positive grid bias from the capacitor 30 throughout the full positive half cycles for maximum saturation of the reactors and maximum power input to the resistors.

It is evident that, in the event of failure of the electric valve 31 during normal operation, the feedback hold-off voltage across the capacitor 28 will decrease to a very low value approaching zero, and consequently the discharge device 23 will fully saturate the reactors and apply full power to the resistors 10, 11 and 12. This condition assumes sufficient voltage across the capacitor 30 to overbalance the negative bias applied to the grid 27 from the capacitor 29 so that, in the event of a very low voltage across the capacitor 28, the grid 27 is sufficiently positive at all times to cause firing of the discharge device.

In accordance with my invention, I provide for the operation of the switch 26 through the discharge circuit formed by the anode 48 and cathode 34 of the valve 31 so that, in the event of failure of the valve 31, the switch 26 opens in accordance with its bias thereby opening the circuit through the saturating coils and the device 23. As shown, I connect a relay coil 49 in this discharge circuit in parallel with a condenser or capacitor 49a, together with a voltage from the transformer winding 46 so that when the valve 31 is operating, the coil 49 is energized and the relay switch 50 operated thereby is closed. The condenser 49a is provided to give continuous excitation of the coil 49, the condenser being charged during the positive half cycles that the current flows from the anode 48 to the cathode 34 and discharging into the coil during the negative half cycles. The switch 50 closes a circuit through an auto-transformer winding 51 connected to the supply mains 24 and 25, across a portion of which is connected a time delay actuating device 52 arranged, when energized, to close the switch 26 after a predetermined time delay.

Thus, when the supply conductors 24 and 25 are energized by the closure of the switches 53 and 54, the coil 49 is energized and the switch 50 closed by operation of the valve 31, and after a predetermined time interval, the device 52 closes the switch 26. During this time interval the cathode 55 of the device 23 is heated to a desired operating value. It will be understood from the previous description that in the event of failure of the valve 31, the coil 49 is deenergized and the switch 26 is opened to decrease the power in the heating resistors to a minimum.

It will be observed that failure of the valve 32 does not cause an increase in the power input to the resistors because such failure results in the gradual discharge of the capacitors 29 and 30, leaving the feedback capacitor 28 to turn off the device 23. Also, of course, failure of the device 23 results in the decreasing to a minimum of the supply of current to the heating resistors by the increase to a maximum of the reactance of the reactances 17, 18, and 19. It will be understood that the cathodes of the electric discharge devices are suitably heated through electric transformer means (not shown) connected to the supply mains 24 and 25. For example, each cathode may be heated by a secondary winding associated with the primary winding.

A suitable half wave rectifying or valve discharge device 55 with a resistance 56 in series with it is connected in parallel with the saturating windings 17, 18, and 19 for the purpose of passing current during the half cycles that the device 23 is not operating and thereby to maintain a substantially constant current in the windings by reason of the inductive voltage across the windings. The resistance 56 limits the short-circuit current in the event of an arc-back for one or more cycles through either the device 23 or 55.

It will be understood that various current varying means may be used to control the current in the heating circuit. For example, instead of the reactors 17, 18, and 19, electric discharge devices of a cold mercury pool cathode, two-element, type may be used directly in the heating circuit, these discharge devices being controlled by the discharge device 23.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A control system comprising current varying means for connection in circuit with a load device, a grid controlled electric discharge device for controlling said current varying means, a first control voltage supply means normally biasing said grid controlled device to effect a predetermined flow of current in the load device, a two-circuit valve device, means responsive to an operating condition of the load device connected in one circuit of said valve device for supplying a control voltage in opposition to said first control voltage thereby to decrease the current in the load device, and circuit control means connected in the second circuit of said valve device for reducing the current in said current varying means to a predetermined minimum value upon failure of said valve device.

2. A temperature control system comprising current varying means for connection in circuit with a load device, a grid controlled electric discharge device for controlling said current varying means, electric supply means for applying a predetermined constant control voltage to said grid for controlling said electric discharge device to provide a predetermined maximum current in said load device, a two-circuit electric valve device, supply means responsive to a condition of operation of said load device including one circuit of said valve device for supplying a control voltage in opposition to said first control voltage to render said discharge device inactive and thereby reduce the current in said load device to a predetermined minimum value, a normally open switch in a circuit of said electric discharge device, and means in the second circuit of said valve device so as to be energized thereby to maintain said switch closed but deenergized in the event of failure of said valve device thereby to open said switch and reduce the current in said load device to a predetermined minimum value.

3. A control system comprising a load device, variable impedance means connected in circuit with said load device, a control winding for said impedance means, a grid controlled electric discharge device for supplying current to said control winding, a first control voltage supply means normally biasing said grid controlled device to pass current to said control winding, a two-circuit valve device, means responsive to an operating condition of said load device connected in one circuit of said valve device for supplying a control voltage in opposition to said first control voltage, and circuit control means connected in the second circuit of said valve device for disabling said control winding upon failure of said valve device.

4. A heating system comprising electric heating means, variable impedance means connected in circuit with said heating means, a control winding for said impedance means, a grid controlled electric discharge device for supplying current to said control winding, a first electric valve device normally biasing said grid controlled device to pass current to said control winding, a second two-circuit valve device, means responsive to an operating condition of said heating means connected in one circuit of said second valve device for supplying a control voltage in opposition to said first control voltage, and circuit control means connected in the second circuit of said valve device for maintaining the supply of current to said control winding during normal operation of said second valve device but discontinuing the supply of current to said control winding upon failure of said second valve device.

5. A control system comprising current varying means for connection in circuit with a load device, variable impedance means connected in series with said load device, a control winding for said impedance means, a grid controlled electric discharge device for supplying current to said control winding, electric supply means for supplying a predetermined constant control voltage for controlling said electric discharge device to pass current to said control winding, a two-circuit electric valve device, supply means responsive to a condition of said load device including one circuit of said valve device for supplying a control voltage in opposition to said first control voltage to render said discharge device inactive, a normally open switch for deenergizing said winding, and a coil for said switch in the second circuit of said valve device so as to be energized thereby to maintain said switch closed but said coil being deenergized in the event of failure of said valve device thereby to open the circuit of said control winding.

6. A heating system comprising electric heating means, variable impedance means connected in series with said heating means, a control winding for said impedance means, a grid controlled electric discharge device for supplying current to said control winding, electric supply means for supplying a predetermined constant control voltage for controlling said electric discharge device to pass current to said control winding, a two-circuit electric valve device, supply means responsive to the voltage across said heating means including one circuit of said valve device for supplying a control voltage in opposition to said first control voltage to render said discharge device inactive, a normally open switch in circuit with said control winding, and means in the second circuit of said valve device so as to be energized thereby to maintain said switch closed but deenergized in the event of failure of said valve device thereby to open the circuit of said control winding.

7. A heating system comprising electric heating means, variable impedance means connected in series with said heating means, a control winding for said impedance means, a grid controlled electric discharge device for supplying current to said control winding, electric supply means for supplying a predetermined constant control voltage for controlling said electric discharge device to pass current to said control winding, a two-circuit electric valve device, supply means responsive to the voltage across said heating means including one circuit of said valve device for supplying a control voltage in opposition to said first control voltage to render said discharge device inactive, a first normally open switch in circuit with said control winding, electric operating means for closing said switch, a second normally open switch in circuit with said operating means, and a coil for said second switch in the second circuit of said valve device so as to be energized thereby to maintain said first switch closed but said coil being deenergized in the event of failure of said valve device thereby to open the circuit of said control winding.

ELBERT D. SCHNEIDER.